United States Patent [19]

Shiga et al.

[11] Patent Number: 4,910,632

[45] Date of Patent: Mar. 20, 1990

[54] LIGHTNING ARRESTER

[75] Inventors: Satoru Shiga; Hirotsugu Koike, both of Kawasaki, Japan

[73] Assignee: Fuji Electric Co., Ltd., Kawasaki, Japan

[21] Appl. No.: 264,821

[22] Filed: Oct. 26, 1988

[30] Foreign Application Priority Data

Dec. 29, 1987 [JP] Japan .................................. 62-335382

[51] Int. Cl.$^4$ .................................................. H02H 3/24

[52] U.S. Cl. ........................................ 361/127; 361/117

[58] Field of Search ................ 361/117, 118, 126, 127, 361/128, 137

[56] References Cited

U.S. PATENT DOCUMENTS 4,001,651 1/1977 Kershaw, Jr. .................. 361/127 X
4,262,318 4/1981 Shirakawa et al. ................. 361/127
4,298,900 11/1981 Aydeenko et al. ............. 361/127 X
4,587,592 5/1986 Nakano et al. ....................... 361/127
4,686,603 8/1987 Mosele ............................ 361/127 X

FOREIGN PATENT DOCUMENTS 61-151913 10/1986 Japan .

*Primary Examiner*—Derek S. Jennings
*Attorney, Agent, or Firm*—Spencer & Frank

[57] ABSTRACT

A lightning arrester having an insulating cylinder which contains resistance elements made of zinc oxide which have a nonlinear voltage-current characteristic are stored. The insulating cylinder is fixed at least one sealing member having passages which connect the inside space of the insulating cylinder with the outside space thereof. These passages are covered with a material adapted to be softened or melted by a heat and are therefore closed in an air-tight manner. The arrester also includes an arc guide for producing arc type spark short-circuit externally of the insulating cylinder due to gas jetted from the passages upon an arc accident in the insulatng cylinder.

9 Claims, 2 Drawing Sheets

LIGHTNING ARRESTER

BACKGROUND OF THE INVENTION

1. Field of the Invention

The present invention relates to a lightning arrester comprising resistance elements made of zinc oxide as a main component, having a nonlinear voltage-current characteristic and being disposed in an insulating cylinder, and more particularly to a lightning arrester having a pressure relief structure in which an excessive gas pressure that is produced in the above-mentioned insulating cylinder upon occurrence of an arc accident is discharged to the outside from the inside of the insulating cylinder.

2. Description of the Prior Art

A conventional pressure relief structure in a lightning arrester in which resistance elements 1 having a nonlinear voltage-current characteristic (which will be hereinbelow denoted "nonlinear elements") are disposed in an insulating cylinder is shown in FIG. 1 (refer to Japanese Patent Application Laid-open No. 61-151913). External threads are formed on outer peripheral surfaces of both end parts of an insulating cylinder 2 made of reinforced plastic material whose mechanical strength is enhanced by use of glass fibers and disposed therein with the nonlinear elements, and a plurality of pressure relief holes 6 are formed in the insulating cylinder 2 on each of circumferences at a plurality of positions in a longitudinal direction. Cap-like metal flanges 3, 13 having on their inner peripheral surfaces internal threads adapted to be engaged with the above-mentioned external threads are screwed onto both end parts of the insulating cylinder while they press a Belleville spring 4, and the nonlinear elements are held in the insulating cylinder and exert on one another a predetermined contact pressure. An insulating pipe 5 prpovided thereon with a plurality of ring-like fins 5*a*, for sealing the pressure relief holes 6 in the insulating cylinder 2 in a gas-tight manner so as to prevent moisture from entering into the cylinder, and for ensuring external insulation for the insulating cylinder 2, is fill-molded on the outer peripheral surface of the insulating cylinder, by using casting resin such as elastic organic insulating materials, for example, silicon rubber or the like. The above-mentioned fill-molding is made such that the casting resin is filled in the inside space of the insulating cylinder 2, and the resin covers the nonlinear elements in a gas-tight manner, and therefore, the nonlinear elements are shielded from moisture which is liable to enter arrester from outside along the inner peripheral surface of the metal flanges 3, 13 thereby it is possible to prevent the nonlinear elements from being deteriorated.

In the thus formed lightening arrester, when excessive surge current exceeding a designed value runs through the nonlinear elements, the nonlinear elements are subjected to a through-breakage or a surface creepage type spark short-circuit, and therefore, the temperature of the casting resin covering the nonlinear elements is raised by arc-heat generated at that time so that the casting resin is softened, or melted. This softening and melting of the reaches the pressure relief holes 6 in the insulating cylinder 2 in a short time thereby causing the softening or melting of the thick wall parts of the insulating pipe 5, corresponding to the pressure relief holes 6. Thereby, gas in the insulating cylinder 2 is discharged to outside through the pressure relief holes 6, and therefore, it is possible to prevent the lightning arrester from exploding.

The thus arranged lightning arrester eliminates the necessity of the provision of a fracture plate which normally closes one end of the insulating cylinder and is fragmented by the internal pressure in the insulating cylinder upon an arc-accident so as to discharge gas to the outside. A discharge section stores the fracture plate and forms a passage for the discharged gas in a conventional lightening arrester. Further, a pressure discharge function may be added as the function of a entire arrangement of the lightning arrester allowing the lightning arrester to be miniaturized in its entirety. However, a lightning arrester having the arrangement shown in FIG. 1 has the following problems:

(1) Even though several pressure relief holes are formed in the insulating cylinder, the pressure relief holes are not practically opened so as to communicate the inside of the cylinder with the outside uniformly at all positions thereof. For example, in the case of an accident of surface creepage spark short-circuit of the nonlinear elements as an arc-accident in the insulating cylinder, the casting resin fills in the pressure relief holes at positions which are located near the spark short-circuit, is readily softened and melted, but the casing resin in the pressure relief holes at positions which are out of a range of the spark short-circuit are not readily softened and melted. Accordingly, the discharge of internal pressure is insufficient as a whole, and since strong gas discharge is continued through the pressure relief holes alone in which the resin is softened and melted, a large insulating space is required around the lightening arrester.

(2) Since behavior of internal arcs is complicated, the pressure is locally not uniform, and the cast resin which fills the pressure relief holes in the part where the pressure is high is pushed out at first so that an excessive pressure condition is continued while an insufficient pressure discharge condition remains. Therefore it is difficult to obtain several opened pressure relief holes.

SUMMARY OF THE INVENTION

An object of the present invention is to provide a lightening arrester which has sufficient pressure discharge capability while avoiding increase in the size of the lightening arrester, and which can eliminate the necessity of providing a large insulating space around the lightening arrester.

To attain the above-mentioned object, the present invention provides a lightening arrester, comprising:

resistance elements made of zinc oxide as a main component and having a nonlinear voltage-current characteristic;

an insulating cylinder for storing the resistance elements therein with a predetermined gap;

sealing members fixed to both ends of the insulating cylinder while holding the resistance elements, at least one of the sealing members having therein passages which communicate inside space of the insulating cylinder with outside space thereof;

a covering member covering an outlet of the passage and adapted to be softened and melted by heat; and an arc guide provided at one side end of the sealing member in which the passage is formed, and adapted to produce an arc type spark short-circuit on the outside of the insulating cylinder due to gas jetted from the passage upon generation of an arc in the insulating cylinder.

Each of the sealing members may have a passage penetrating the inside space of the insulating cylinder with the outside space thereof, and may be provided at its end with an arc guide, respectively.

The arc-guides may be formed in a bowl shape, having their openings facing each other.

The covering member covering the outlet of the passage and adapted to be softened or melted by heat, may be organic insulating material covering the insulating cylinder including an outer peripheral surface thereof.

The sealing members may have thread parts projecting outward, respectively, and the arc guide may be screwed onto the thread part, respectively.

The sealing members may be made of metal.

In the thus arranged lightening arrester, since no casting resin fills the inside of the insulating cylinder, when the covering member covering the outlet of passage having a size sufficient for gas discharge upon an arc-accident in the insulating cylinder is softened or melted due to heat radiation of arc heat or heat transmission from the gas in the insulating cylinder, the gas in the insulating cylinder flows without being subjected to substantial resistance toward the passage and is discharged. Accordingly, the pressure in the cylinder is rapidly lowered. Further, since the arc guide for changing a stream of the gas discharged from the passage in the sealing member into the longitudinal direction of the insulating cylinder so as to form a spark short-circuit path of arcs outside of the insulating cylinder, and since, therefore, the spark short-circuit path is shifted from the inside to the outside of the insulating cylinder, electrical energy fed into the inside of the insulating cylinder is extinguished after the spark short-circuit is shifted to the outside of the insulating cylinder, and therefore, the pressure in the insulating cylinder is more rapidly lowered.

Accordingly, with this arrangement of the lightening arrester, it is possible to provide the lightening arrester which has no large size as a whole but has a safe pressure discharge function, and which requires no large insulating space therearound.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
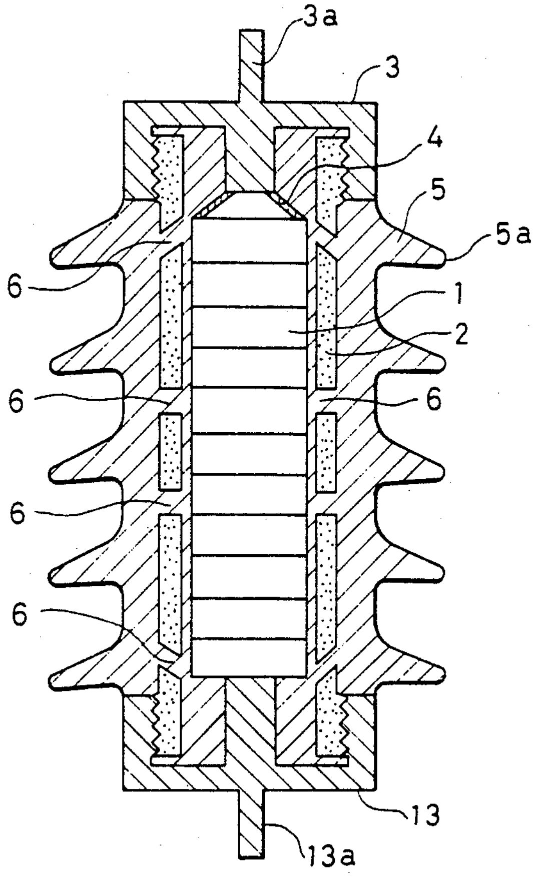
FIG.1 PRIOR ART
FIG. 1 is a vertical sectional view showing a structure of a conventional lightening arrester.
Figure 2:
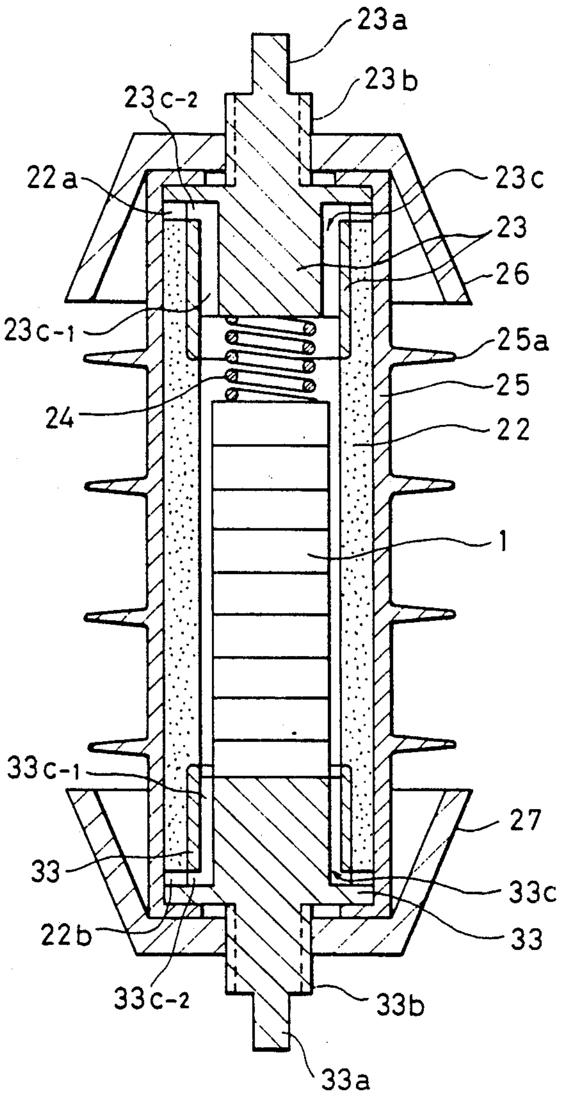
FIG. 2 is a vertical sectional view showing a structure of a lightening arrester in one embodiment form according to the present invention.

FIG. 2 shows a lightning arrester in one embodiment form according to the present invention. Both end parts of an insulating cylinder 22 storing therein columnar nonlinear element 1 with a predetermined gap are molded integrally with sealing members 23, 33 with a compression spring 24 being pressed.

The nonlinear elements 1 are resistance elements made of zinc oxide as a main component and having a nonlinear voltage-current characteristic as in the conventional arrangement, and the insulating cylinder 22 is made of reinforced plastic material having a mechanical strength reinforced by use of glass fibers. The sealing members 23, 33 made of metal are formed therein with a plurality of through-holes 23*c*, 33*c*. These through-holes 23*c*, 33*c* consist of axial holes 23*c*-1, 33*c*-1, and radial holes 23*c*-2, 33*c*-2. Further, cut-outs 22*a*, 22*b* are formed at positions corresponding to these plural radial holes 23*c*-2, 23*c*-2, respectively. The through-holes 23*c* and these cut-outs 22*a*, and the through-holes 33*c* and the cut-outs 22*b* establish passages communicating inside space of the insulating cylinder 22 with outside space thereof.

In an alternative embodiment, by separately preparing the insulating cylinder 22 and the sealing members 23, 33 beforehand, instead of integrally molding of the insulating cylinder 22 and the sealing members 23, 33, internal threads may be formed in the inner peripheral surface of both end parts of the insulating cylinder while external threads are formed in the outer peripheral surfaces of the sealing members 23, 33. The threads allow both sealing members 23, 33 to be screwed onto the end parts of the insulating cylinders them to each other when the compression spring 24 being pressed.

The sealing members 23, 33 have thread parts 23*b*, 33*b* axially projecting outward of insulating cylinder connecting terminals 23*a*, 33*a* projecting further axially outward of the thread parts. Thus, the outer surfaces of the insulating cylinder 22 and the sealing members 23, 33, which are integrally incorporated with each other, are covered by means of fill-molding with a cover member 25 made of an elastic insulating material such as silicon rubber or the like. The outer surfaces are covered in an air-tight manner, except for the thread parts 23*b*, 33*b* and the connecting terminals 23*a*, 33*a* which are left uncovered. The covering member 25 has formed on its outer peripheral part a plurality of ring-like ribs 25*a*. Further, bowl-like arc guides 26, 27 are screwed coaxially onto the thread parts 23*b*, 33*b*, respectively, so that their open end sides face each other.

When an arc accident occurs in the inside of the insulating cylinder 22 in the thus arranged lightening arrester, radiation of arc heat heats the gas surrounding the nonlinear elements 1. Further, the pressure inside the cylinder is raised due to the heating of the gas by arc heat, causing the gas to move toward the through-holes 23*c*, 33*c*, thereby raising the temperature of the metal parts around the through-holes. This causes the covering member 25 made of elastic organic insulating material covering the passages of the through-holes to soften or melt to allow the pressurized gas to be jetted from the passages and blown onto the inner peripheral surfaces of the arc guides 26, 27. Since no material to be softened or melted by heat is filled in the the gap between the insulating cylinder 22 and the nonlinear elements 1, even though arcs produced in the insulating cylinder 22 may take any path, the pressurized gas in the insulating cylinder can move toward the through-holes without being subjected to substantial flow resistance. Accordingly, the pressure in the insulating cylinder 22 can be rapidly lowered when the material covering the passages of the outlet holes is softened or melted so that the gas is jetted out.

Further, since the arc guides 26, 27 are formed in a bowl shape, the jetted gas is deflected along the longitudinal direction of the insulating cylinder 22. Further, since the thus jetted gas has already ionized due to the art heat, a spark short-circuit path having a very low proof-voltage is formed outside of the insulating cylinder 22.

Since the arcs can be shifted into the above-mentioned spark short-circuit path, gas pressure in the insulating cylinder is reduced at a remarkably high rate in comparison with the rate of an arrangement in which no such a spark short-circuit path is formed.

Meanwhile, in the present invention the arcs in the insulating cylinder are produced in a narrow space around the nonlinear elements 1, and are cooled by the stream of gas around the arcs which is directed toward the passages 23c, 33c. Therefore, the arc voltage in the insulating cylinder 22 is remarkably high in comparison with the arc-voltage in a normal wide static gas space. Moreover, the spark short-circuit path formed outside of the insulating cylinder 22 can be easily dielectrically broken by the arc voltage, and the arcs in the insulating cylinder 22 are immediately shifted into the spark short-circuit path outside of the insulating cylinder 22. After the arcs are shifted, no more electrical energy is fed into the insulating cylinder 22, and, therefore, the gas pressure in the insulating cylinder 22 can be rapidly lowered.

Further, due to a process of formation of the spark short-circuit path, it is possible to eliminate the necessity of an insulating space around the lightening arrester. Further, since the sealing members 23, 23 formed therein with the through-holes 23c, 33c are made of metal material having a low heat capacity, a temperature rise due to the radiation of arc heat and the heat transmission from high temperature gas is fast, and therefore, the opening of the through-holes is made quickly.

The invention has been described in detail with respect to preferred embodiments, and it will now be apparent from the foregoing to those skilled in the art that changes and modifications may be made without departing from the invention in its broader aspects, and that the scope of the invention is defined by the appended claims cover all such changes and modifications as fall within the true spirit of the invention.

What is claimed is:

1. A lightning arrester comprising:

an insulating cylinder having an inside, an outside and two ends;

resistance elements located within said cylinder and separated from said cylinder by a gap, said resistance elements being made of zinc oxide and having a nonlinear voltage-current characteristic;

sealing members fixed to both ends of said insulating cylinder for holding said resistance elements, at least one of said sealing members having therein a passage including an outlet for allowing gas to be jetted from the inside of said insulating cylinder;

a covering member made of an organic insulating material for covering an outlet of said passage and adapted to be softened or melted by heat, said covering member covering said insulating cylinder and being part of an outer peripheral surface of said insulating cylinder; and an arc guide attached to each of said sealing members and adapted to produce an arc type spark short-circuit on the outside of said insulating cylinder when gas is jetted from said passage upon generation of an arc in said insulating cylinder.

2. A lightning arrester as claimed in claim 1, wherein said arc-guides are bowl shaped and having openings facing each other.

3. A lightning arrester as claimed in claim 1, wherein said sealing members and said arc guides have threaded parts for engaging each other.

4. A lightning arrester as claimed in claim 2, wherein said sealing members and said arc guides have threaded parts for engaging each other.

5. A lightning arrester as claimed in claim 1, wherein each of said passages consists of a passage which is axial with respect to a center axis of said sealing member and a passage which is radial with respect to said center axis of said sealing member.

6. A lightning arrester as claimed in claim 5 wherein said arc-guides are bowl-shaped and having openings which face each other.

7. A lightning arrester as claimed in claim 6, wherein said sealing members and said arc guides have thread parts which engage each other.

8. A lightning arrester as claimed in claim 1, wherein said covering member is made of a silicone rubber.

9. A lightning arrester as claimed in claim 1, wherein both of said sealing members have said passages therein.

* * * * *